US008875207B2

(12) United States Patent
Weintraub et al.

(10) Patent No.: US 8,875,207 B2
(45) Date of Patent: *Oct. 28, 2014

(54) CONTENT STORAGE AND DELIVERY SYSTEM AND ASSOCIATED METHOD AND DEVICE

(75) Inventors: Michael A. Weintraub, Medfield, MA (US); Stuart D. Elby, Ridgefield, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/292,689

(22) Filed: Nov. 9, 2011

(65) Prior Publication Data

US 2012/0102535 A1    Apr. 26, 2012

Related U.S. Application Data

(63) Continuation of application No. 11/567,541, filed on Dec. 6, 2006, now Pat. No. 8,316,411.

(51) Int. Cl.
*H04N 7/173* (2011.01)
*H04N 21/6405* (2011.01)
*H04N 21/462* (2011.01)
*H04N 21/4335* (2011.01)
*H04N 21/231* (2011.01)
*H04N 21/433* (2011.01)
*H04N 21/2747* (2011.01)

(52) U.S. Cl.
CPC ....... *H04N 7/17318* (2013.01); *H04N 21/6405* (2013.01); *H04N 21/4622* (2013.01); *H04N 21/4335* (2013.01); *H04N 21/23113* (2013.01); *H04N 21/4331* (2013.01); *H04N 21/2747* (2013.01); *H04N 21/23106* (2013.01)

USPC ......................................................... 725/110

(58) Field of Classification Search
None
See application file for complete search history.

(56) References Cited

U.S. PATENT DOCUMENTS

| 5,854,887 | A  | 12/1998 | Kindell et al.  |
| 6,108,631 | A  |  8/2000 | Ruhl            |
| 6,331,983 | B1 | 12/2001 | Haggerty et al. |
| 6,574,795 | B1 |  6/2003 | Carr            |

(Continued)

OTHER PUBLICATIONS

Annapureddy, et al., "Providing Video-on-Demand Using Peer-to-Peer Networks", Annapureddy, et al., "Providing Video-on-Demand Using Peer-to-Peer Networks," Microsoft Research, 14 pages, Jan. 2006.

(Continued)

*Primary Examiner* — Rong Le

(57) ABSTRACT

A system is provided for the storage of content on a network and the delivery of content to subscriber locations. The system includes routers and subscriber set-top boxes in communication with each other and a main content source. Content is delivered over a packet-switching network according to a peer to peer file distribution protocol and is stored in a storage area of the subscriber set-top box, such that each subscriber set-top box is configured to transmit and receive content to and from the main content source and other set-top boxes connected to the network. The set-top boxes may identify a preferred source of content based on various factors, such as geographic distance, Internet Protocol (IP) distance, available bandwidth, integrity of the content, etc. An associated method for accessing content and a set-top box for facilitating the storage and delivery of content are also provided.

20 Claims, 4 Drawing Sheets

(56) References Cited

U.S. PATENT DOCUMENTS

| | | | |
|---|---|---|---|
| 6,981,032 B2 | 12/2005 | Boivie et al. | |
| 7,028,096 B1* | 4/2006 | Lee | 709/231 |
| 7,096,486 B1 | 8/2006 | Ukai et al. | |
| 7,107,606 B2 | 9/2006 | Lee | |
| 7,194,091 B2 | 3/2007 | Higashi et al. | |
| 7,324,553 B1 | 1/2008 | Varier et al. | |
| 2002/0162109 A1* | 10/2002 | Shteyn | 725/87 |
| 2003/0110503 A1 | 6/2003 | Perkes | |
| 2003/0182125 A1 | 9/2003 | Phillips et al. | |
| 2004/0264443 A1 | 12/2004 | Beck et al. | |
| 2005/0097281 A1 | 5/2005 | Tanaka | |
| 2005/0198228 A1 | 9/2005 | Bajwa et al. | |
| 2007/0009235 A1* | 1/2007 | Walters et al. | 386/112 |
| 2007/0124779 A1 | 5/2007 | Casey et al. | |
| 2008/0209494 A1 | 8/2008 | Dravida et al. | |

OTHER PUBLICATIONS

Annapureddy, et al., "Shark: Scaling File Servers via Cooperative Caching", Annapureddy, et al., "Shark: Scaling File Servers via Cooperative Caching," Network Systems Design and Implementation (NSDI'05), vol. 2, 14 pages, May 2005.

Chan, et al., "Caching Schemes for Distributed Video Services", Chan, et al, "Caching Schemes for Distributed Video Services," IEEE International Conference on Communications (ICC '99), vol. 2, pp. 994-999, Jun. 6-10, 1999.

Chan, et al., "Distributed Servers Architecture for Networked Video Services", Chan, et al, "Distributed Servers Architecture for Networked Video Services," IEEE/ACM Transactions on Networking, vol. 9, No. 2, pp. 125-136, Apr. 2001.

Chan, et al., "Threshold-based Admission Policies for Video Services", Chan, et al, "Threshold-based Admission Policies for Video Services," Global Telecommunications Conference (GLOBECOM '99), vol. 4, pp. 2076-2080, Dec. 5-9, 1999.

Dilley, et al., "Globally Distributed Content Delivery", Dilley, et al., "Globally Distributed Content Delivery," IEEE Internet Computing, vol. 6, Issue 5, pp. 50-58, Sep.-Oct. 2002.

Fahmi, "Proxy Servers for Scalable Interactive Video Support", Fahmi, et al., "Proxy Servers for Scalable Interactive Video Support," Computer, vol. 34, Issue 9, pp. 54-60, Sep. 2001.

Feng, et al., "A Novel Architecture for Video-on-demand Services", Feng, et al., "A Novel Architecture for Video-on-demand Services," The Fifth International Conference on Computer and Information Technology (CIT '05), pp. 640-644, Sep. 21-23, 2005.

Nicolosi, et al., "P2PCAST: A Peer-to-Peer Multicast Scheme for Streaming Data", Nicolosi, et al, "P2PCAST: A Peer-to-Peer Multicast Scheme for Streaming Data," 1st IRIS Student Workshop (ISW'03), pp. 1-13, May 9, 2003.

Tang, et al., "Optimal Video Placement Scheme for Batching VOD Services", Tang, et al., "Optimal Video Placement Scheme for Batching VOD Services," IEEE Transactions on Broadcasting, vol. 50, No. 1, pp. 16-25, Mar. 2004.

* cited by examiner

CONTENT STORAGE AND DELIVERY SYSTEM AND ASSOCIATED METHOD AND DEVICE

RELATED APPLICATIONS

This application is a continuation application of U.S. patent application Ser. No. 11/567,541 by Michael A. Weintraub et al., filed on Dec. 6, 2006, and entitled CONTENT STORAGE AND DELIVERY SYSTEM AND ASSOCIATED METHOD AND DEVICE, which is hereby incorporated by reference in its entirety.

BACKGROUND

The demand for access to shared content, such as video content, audio content, Internet web content, or interactive games, among other types of content, is ever increasing and becoming more challenging to meet. Subscribers to a content provider network are seeking access to larger files, are seeking this access more frequently, and are demanding that this access be faster, more reliable, and more cost effective.

The storage of content on a network and its distribution from a content provider to various subscribers of the network has traditionally been accomplished through a hierarchical client-server protocol, where a central server, such as a content library, stores content for sharing among the subscribers. For example, digital video content, such as movies and television broadcasts, may be stored in a content library that is accessible by equipment at the various subscriber locations. When a subscriber requests to see a certain movie, the subscriber's equipment, such as a set-top box, running the same communication protocol as the content library will communicate with the content library to download the requested movie to the subscriber location for viewing on a television or computer screen.

Certain types of content, such as digital video content, consist of large amounts of data. Such content requires more space for storage in the central content library and more time for downloading to the subscriber location. At times of heightened demand, for example when a new movie has been released to the content library and many subscribers desire to see the same movie at the same time, the system can be overwhelmed and unable to meet the demand. Some subscribers may be unable to access the content at all. Other subscribers who are able to access the content may experience longer download times or poor content quality. Furthermore, as content is added to the content library, the storage capacity of the library must be increased to accommodate the growing volume of content. The larger content library may similarly impose upon subscribers the problems of slow downloads and poor content quality.

In order to improve the situation for subscribers, content providers have attempted to pre-distribute content closer to the subscribers. For example, smaller, intermediate content libraries may be formed and dedicated to the service of a smaller number of the total subscriber base. Popular content, such as newly released movies, may then be moved to the intermediate content libraries so that they are more easily accessible by the corresponding groups of subscribers. Although such pre-distribution of content does serve to improve the subscribers' access to the content, there are tremendous storage costs to the content provider associated with forming the various intermediate content libraries. There are also significant operational costs incurred by the content provider due to the requirement for personnel to engineer the content distribution on a regular basis. In other words, the content provider incurs significant costs in determining which content is in demand and where best to store the content.

Therefore, there is a need for a system to store content on a network and to deliver the content from a content provider to a subscriber in a manner that improves the location of the content with respect to the various subscribers, is highly resilient and meets customer expectations with regards to download speeds and content quality, is cost effective, and reduces content library growth requirements.

BRIEF DESCRIPTION OF THE SEVERAL VIEWS OF THE DRAWING(S)

DETAILED DESCRIPTION

Exemplary embodiments now will be described hereinafter with reference to the accompanying drawings, in which exemplary embodiments and examples are shown. Like numbers refer to like elements throughout.

Systems and methods for storing and delivering content over a network as well as a set-top box for facilitating the storage and delivery of content are provided in accordance with various exemplary embodiments. In general, a network is described having a number of set-top boxes and a main content source, such as a content library. The content library and each subscriber set-top box are configured to operate according to a peer to peer file distribution protocol. The protocol is aware of the network topology, the accessibility of set-top boxes on the network, and cost metrics consisting of router hops and set-top box upstream bandwidth. The protocol uses this information to automatically select sources of content in a more efficient and cost-effective manner.

Figure 1:
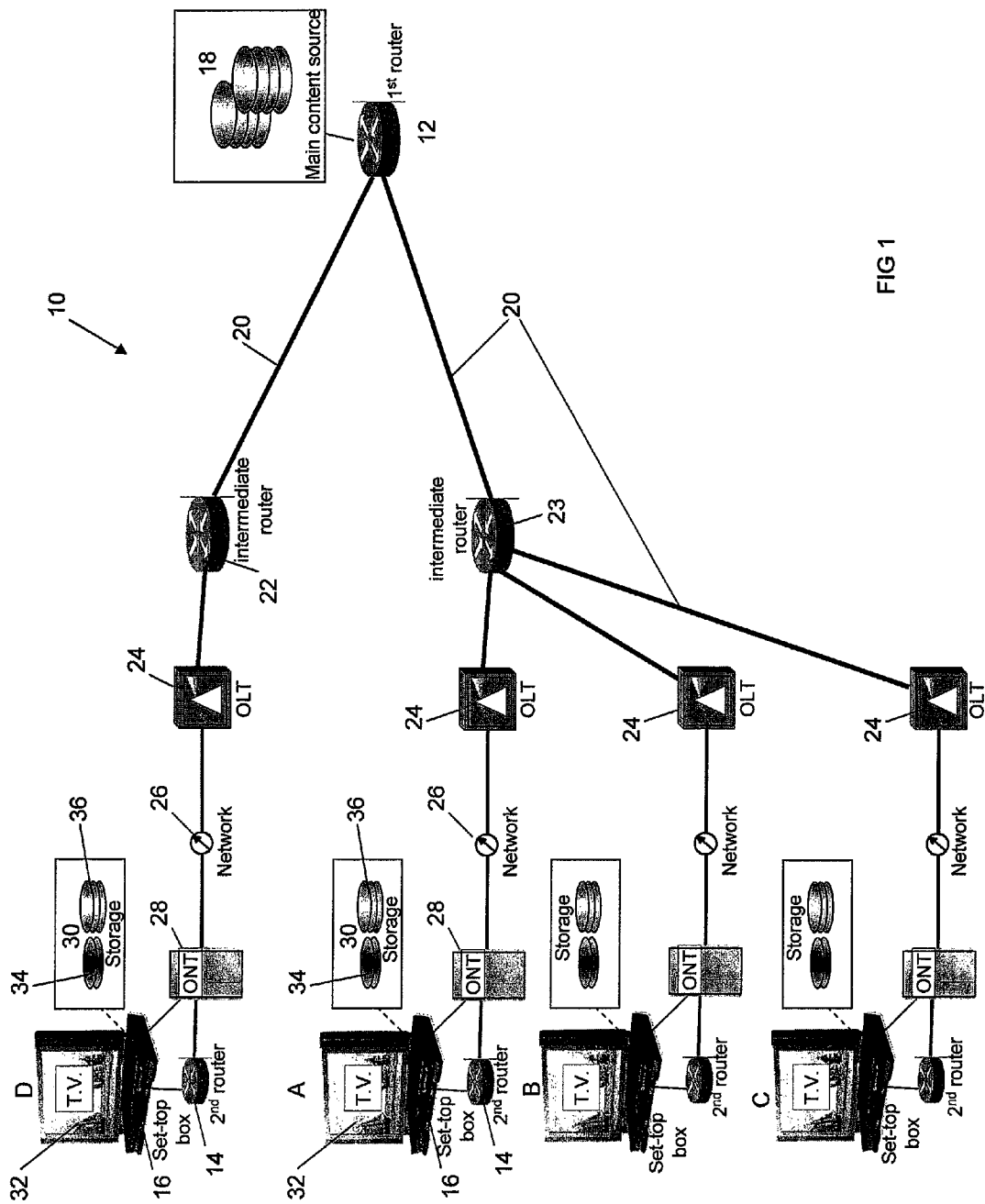
FIG. 1 is a schematic representation of one embodiment of the content storage and delivery system which has network elements including intermediate routers and a plurality of subscriber set-top boxes.

Referring to FIG. 1, embodiments of the system 10 comprise a first router 12, a plurality of second routers 14, and a plurality of subscriber set-top boxes 16. Each subscriber set-top box 16 is connected to a main content source 18 via the routers through a communication pathway 20, which may comprise, for example, copper cable, fiber optic cable, a wireless connection, or a combination of these and/or other communication links. The system may also comprise intermediate routers 22, 23 disposed along the communication pathway 20 between the main content source 18 and the subscriber set-top boxes 16. As such, a relatively hierarchical network is established between the main content source 18 and the subscriber set-top boxes 16. Typically, the network is a packet-switching network with the subscriber set-top boxes 16 being configured to transmit and receive content over the network according to a peer to peer file distribution protocol.

In FIG. 1, content may be transmitted from the main content source 18 through the first router 12 to either or both intermediate routers 22, 23 in parallel. While two intermediate routers 22, 23 are depicted in the embodiment of FIG. 1, a network typically includes many intermediate routers 22, 23 with the first router 12 configured to control distribution of the content to a selected one or more of the intermediate routers 22, 23. The content may be digital, for example, and may include data such as video content, audio content, Internet web content, or interactive games. The first router 12 may be a video distribution router, for example, and the intermediate routers 22, 23 may be gateway routers. In embodiments in which the portion of the network between the intermediate routers 22, 23 and the subscribers consists of optical fibers, each branch of the communication pathway 20 in FIG. 1 is configured to transmit content from the intermediate routers 22, 23 to an optical line termination (OLT) unit 24, either directly as shown or via additional intermediate routers 22, 23. The OLT unit 24 receives the content and converts the content to corresponding optical signals for transmission to the subscriber. More than one communication pathway 20 may extend from one intermediate router 22, 23, thereby allowing the connection of more than one OLT units 24 to one intermediate router 22, 23. Routers in communication with multiple subscriber set-top boxes 16 served by the respective router, such as intermediate router 23 in FIG. 1, act as hubs to coordinate communication among the respective subscriber set-top boxes 16, as well as between each respective subscriber set-top box 16 and the main content source 18.

Continuing along each communication pathway 20, the fiber optic cable runs from the OLT unit 24, through an access network 26, such as a gigabit-capable passive optical network, towards the subscriber set-top boxes 16. Each set-top box 16 is associated with a second router 14 and an optical network termination (ONT) unit 28. The ONT unit 28 converts the content, which may be in the form of an optical signal, to a format that is compatible with the subscriber set-top box 16, such as corresponding electrical signals. The second router 14 may be a broadband home router, for example, and may be capable of receiving the content from the ONT unit 28 and transmitting the content to the associated set-top box 16 for eventual display on a television, computer, or other peripheral 32 to which the set-top box 16 is connected.

The main content source 18 is configured to store content that may be accessed and copied, e.g., downloaded, by the various subscriber set-top boxes 16 through the associated communication pathways 20. For example, the main content source 18 may be a server such as a content library holding video content to be transmitted on demand to the subscriber set-top boxes 16. When a subscriber at location A wishes to access certain content, for example a movie, from the content provider, a query is transmitted using to a peer to peer file distribution protocol from the subscriber set-top box 16 at A to the closest hub along the communication pathway 20, which in FIG. 1 would be intermediate router 23.

Unlike prior approaches in which the query would have always been directed to and serviced by the main content source 18, exemplary embodiments of the system 10 and method initially attempt to access the requested content from other subscriber set-top boxes 16 served by the same hub which had previously downloaded and stored the requested content. As such, intermediate router 23 in FIG. 1 routes the query to other set-top boxes 16 connected to the same hub router 23, or in this case B and C. If a queried set-top box 16 has the requested content, the queried set-top box 16 will transmit data back to the requesting set-top box 16 at A. The data transmitted may include identifying information, such as the network address of the queried set-top box 16, as well as other descriptive data, such as the physical location of the queried set-top box 16 and the associated data transmission rate or bandwidth. Each subscriber set-top box 16 therefore includes a storage area 30, e.g., memory, such as a disk, for storing such data as well as for storing content downloaded by the set-top box 16. Information in the set-top box 16 may be updated periodically by the content provider, for example once a day or once a week, to include new subscriber set-top boxes 16 added to the network and the removal of subscriber set-top boxes 16 from the network. Information for new set-top boxes may include the IP address, the location in the network topology, and upstream bandwidth.

If no queried set-top box 16 has the content requested, the query will be transmitted to the next available upstream (i.e., closer to the main content source 18 in terms of network topology) hub or router. This next available upstream hub relays the query to the subscriber set-top boxes 16 serviced by the hub and relays any responses from the set-top boxes 16 to the set-top box 16 that made the initial query. If no queried set-top box 16 can provide the requested content, this process continues with more upstream hubs canvassing increasingly larger subsets of set-top boxes 16 until the query reaches the first router 12 associated with the main content source 18. For example, if the query transmitted by A is not satisfied by B or C in the embodiment of FIG. 1, the query will be forwarded to the first router 12. In one embodiment, the first router 12 not only determines that the requested content can be provided by the main content source 18, but also transmits the query to the other set-top boxes 16 connected thereto and relays any responses to the set-top box 16 that made the initial query. Thus, if none of the subscriber set-top boxes 16 that are queried along the pathway 20 have the requested content, the requesting set-top box 16 may access the content from the set-top box 16 at D or the main content source 18.

The content provider may decide to route the query directly back to the content source 18 at its discretion instead of directing it down another branch of the network hierarchy for operational reasons. An example of an operational reason may be that the network cost of reaching the main content source 18 is less than the network cost of reaching a group of set-top boxes 16. Another operational reason may be that the content provider determines that a particular section of the network is more congested than the communication pathway 20 leading to the main content source 18.

Alternatively, the requesting set-top box 16 may broadcast the query to all set-top boxes 16 in the area capable of receiving the query. This may include set-top boxes 16 served by the same hub as the requesting set-top box 16 as well as set-top boxes served by upstream hubs. In the case where the query is broadcast to all set-top boxes 16 in the area, the requesting set-top box 16 may initially receive responses from only some of set-top boxes 16, such as the set-top boxes 16 that are closer than other set-top boxes 16 in terms of network topology to the requesting set-top box 16. If the requesting set-top box 16 is able to obtain the predetermined content from the first responding set-top boxes 16, i.e., the closer set-top boxes 16, then any subsequent responses received from other set-top boxes 16 having the predetermined content may be ignored by the requesting set-top box 16.

Once the requesting set-top box 16 has accessed the requested content, from whatever source, a copy of the content is stored in the respective storage area 30. In one embodiment, the storage area 30 is partitioned, either physically or logically, into at least two partitions 34, 36, at least one of which is accessible by the content provider. The partition 36 accessible by the content provider may be designated for the sole use of the content provider and secured against access by anyone else, including the associated subscriber, resulting in exclusive access of the partition 36 by the content provider.

The copy of the content accessed may be stored in the partition 36 of the storage area 30 accessible by the content provider. In this way, when a future query is received from a remote set-top box 16, for example the set-top box 16 at C, the content stored in the partition 36 of the storage area 30 accessible by the content provider (at A) will be referenced, and content satisfying the query may be copied or streamed from the partition 36 of the storage area 30 accessible to the content provider of the queried set-top box 16 (A) to the partition 36 of the storage area 30 accessible to the content provider of the requesting set-top box 16 (C). The subscriber set-top boxes 16 may be designed to automatically delete content in the designated partition 36 of the storage area 30 after a certain amount of time has passed. For example, the partition 36 of the storage area 30 accessible to the content provider may be cleared every 24 hours to allow space in the storage area 30 for the storage of newer content.

The subscriber set-top box 16 may be configured to determine the preferred source of the requested content. For example, the requesting set-top box 16 at A may determine which of the queried set-top boxes 16 at B and C having the requested content is geographically closest to the location of the requesting set-top box 16 (A) based on the identifying data transmitted from each of the queried set-top boxes 16 (B and C) to the requesting set-top box 16 (A). Alternatively, the requesting set-top box 16 at A may determine which of the queried set-top boxes 16 having the requested content is the closest in terms of Internet Protocol (IP) network location to the requesting set-top box 16 (A). For example, referring to FIG. 1, if both the set-top boxes 16 at B and D were queried by the set-top box 16 at A, the requesting set-top box 16 at A would determine that B is closer in terms of IP network distance than D because content from D would have to make three router hops (22, 12, 23) whereas content from B would only have to make one router hop (23) to reach A. As this example indicates, closeness in terms of IP network location may be determined based on the number of routers required to relay the content to the requesting set-top box 16.

The requesting set-top box 16 (A) may be configured to analyze the data transmission rate, for example the bandwidth, associated with each of the queried set-top boxes 16 (B and C) having the requested content to determine which set-top box 16 would provide the fastest and most reliable connection. The subscriber set-top boxes 16 may also be configured to determine the preferred source of the requested content in other manners, if so desired. By accessing the content from a preferred source, the efficiency of the download process may be relatively high. For example, accessing the content from a relatively near set-top box 16 as opposed to a relatively distant main content source 18 may reduce the time required to download the file and may reduce the transmission load carried by at least certain portions of the network.

The content stored in the main content source 18 and in the storage area 30 of the various set-top boxes 16 may be fragmented such that the fragments of data, which when combined form a complete file, may be obtained from different locations. For example, digital video content associated with a movie file may be fragmented into smaller files that, together, comprise the whole movie file, the fragments being similar to "chapters" of a movie on Digital Video Disc (DVD). Each fragment may be accessible independently of other fragments of the same file by the requesting set-top box 16 such that if, for example, one of the fragments of a file accessed from a preferred source is missing, damaged, or otherwise inaccessible, the requesting set-top box 16 may access that missing fragment from an alternate source, thereby achieving access to a complete file. By obtaining most of the file from the preferred source, the overall efficiency of the downloading process is still relatively high, even though one or more fragments had to be retrieved from a less preferred source. Alternatively, the requesting set-top box 16 may determine multiple preferred sources. In the case of multiple preferred sources, the efficiency of the downloading process may be increased, and the load on the network may be decreased, by obtaining fragments of the complete file from each preferred source at approximately the same time.

Embodiments of the system 10 described above are not limited to the configuration shown in FIG. 1. The network extending from the content provider to the various subscribers may be designed to meet the demands of a predetermined number of subscribers covering a predetermined geographical region, as dictated by the speed of data transmittal over the communication pathways, the volume of subscriber demands, and the size of the main content source 18. The network may be expanded by connecting more than one main content source 18, 18', each additional main content source 18' supporting its own content-sharing network, such that subscriber set-top boxes 16 associated with one main content source 18 may communicate with other main content sources 18' and with set-top boxes 16' associated with those other main content sources 18' via the first routers 12, 12' associated with the main content sources 18, 18'.

Figure 2:
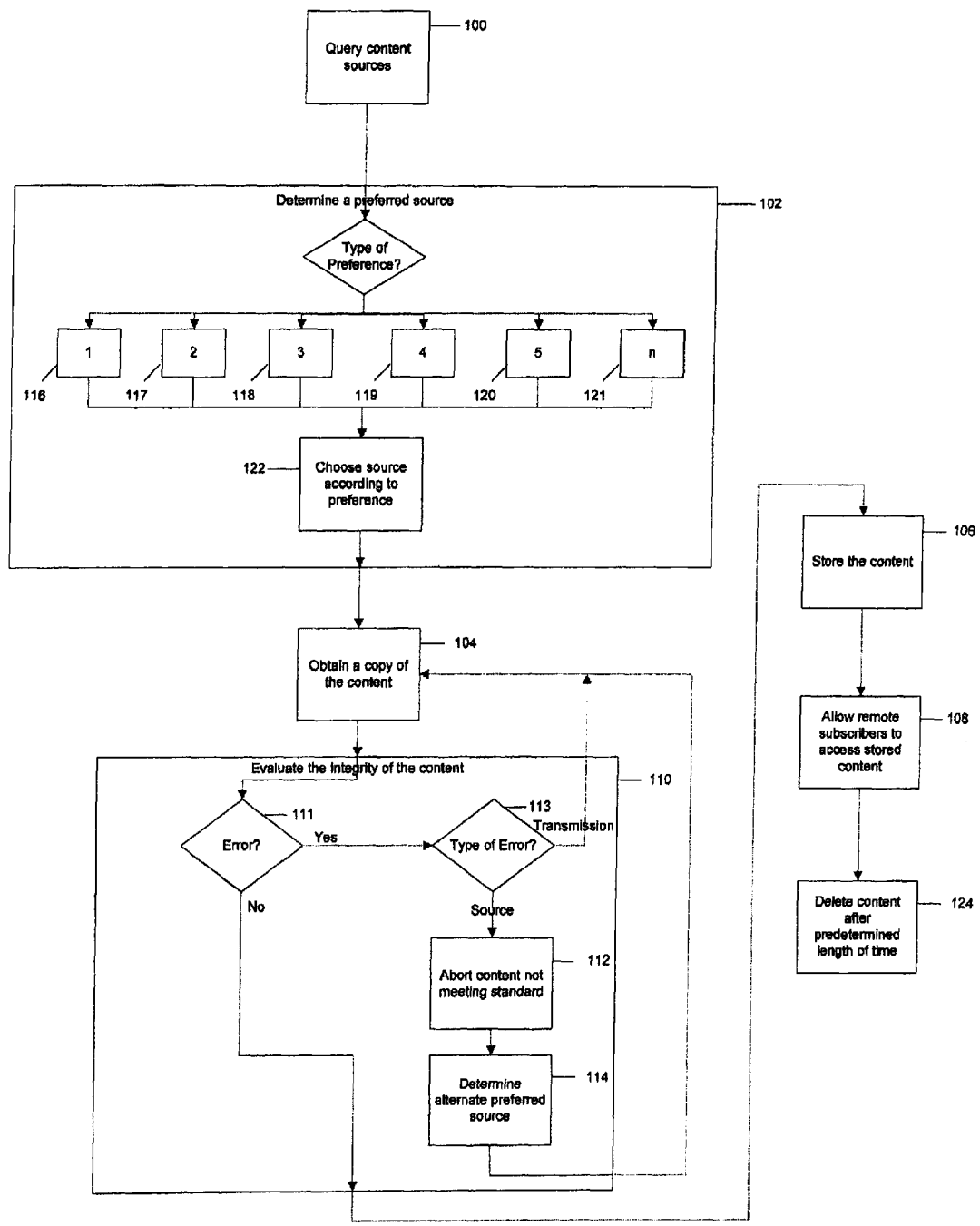
FIG. 2 is a flow chart illustrating embodiments of a method of accessing content.

In other embodiments, a method of accessing content is provided. Referring to FIG. 2, embodiments of the method for accessing content initially query content sources for predetermined content, determine a preferred source of the content, obtain a copy of the content, store the content in a storage area 30 at the subscriber location, and, in turn, allow a plurality of remote subscribers to access content stored in the storage area 30 of the corresponding subscriber location. See FIG. 2, blocks 100-108.

For example, a subscriber desiring to see a movie offered by a content provider may transmit a query for the associated video content through the subscriber's set-top box 16. The query may be transmitted to other set-top boxes 16 connected on the network as well as to other potential content sources, such as a main content source 18, in accordance with the hierarchical distribution techniques described above to identify sources that have the queried content. See block 100.

Of the potential content sources identified, a preferred source of the content is determined, as shown in block 102. Various types of preferences may be used to determine a preferred source of content, as illustrated in blocks 116-122. The preferred source may be determined, for example, according to an algorithm implemented by the set-top box 16 which factors in the geographic distance between each potential content source and the subscriber location and chooses the source associated with the shortest distance. Similarly, the preferred source may be determined according to the Internet Protocol (IP) distance between each potential source and the requesting set-top box 16, the algorithm choosing the source associated with the shortest IP distance. The preferred source may also be determined according to the bandwidth of the potential sources. For example, an algorithm implemented by the set-top box 16 may determine, at the subscriber location, the available bandwidth for each potential source and may then choose the source associated with the largest bandwidth. The selection of a preferred source of content may also be made using a composite function built from any combination of these factors or other factors not mentioned here.

Once a preferred source, as shown in block 102 is determined, a copy of the requested content is obtained at the subscriber location. See block 104. For example, a copy of the movie file may be downloaded from the preferred source to the subscriber's set-top box 16. Some embodiments of the method may additionally include the evaluation of the content accessed, typically after the content is downloaded by the requesting set-top box 16. See block 110. The requesting set-top box 16, for example, may evaluate the downloaded content against a predetermined standard and determine that there is an error. See block 111. In general, an error may be caused by the transmission process or by the source. See block 113. For example, the requesting set-top box 16 may receive less than a complete file, or a portion or all of the file received may be unusable as the result of an error in transmission. Similarly, a predetermined amount of time allowed for the downloading of the file from the preferred source to the subscriber location, such as one minute, may be exceeded. As a result, the requesting set-top box 16 may make another attempt to download the content. See block 104.

If the error reflects a problem with the source of the content, i.e., the preferred source, an alternate preferred source may be determined and the content obtained from the alternate preferred source. For example, if several attempts to download the content from the original preferred source fail, then the unacceptable content may be aborted. Similarly, if the content is illegitimate, e.g., impermissibly copied, or if the file is unusable because some or all of the data contained therein is corrupt, then the unacceptable content may be aborted. The preferred source may then be abandoned and an alternate preferred source determined. See blocks 112-114.

In the case that the preferred source is abandoned and an alternate preferred source is determined, the alternate preferred source may be the source that is, of the remaining potential sources, the most preferred based on the algorithm implemented by the set-top box 16. For example, if the algorithm considered IP network distance as described above, then the alternate preferred source may be the source that is, of the remaining potential source, the closest in terms of network topology to the requesting set-top box 16. It is noted that the operations shown in blocks 110-114 are optional and need not be performed in all instances. If operations 110-114 are not performed, the output of block 104 would generally be provided directly to operation 106.

As shown in block 106, the copy of the content successfully downloaded by the requesting set-top box 16 is then stored in a storage area 30 at the subscriber location, for example in the partition 36 of the subscriber's set-top box 16 accessible to the content provider. The subscriber may then be able to use the content, such as by viewing a movie on a television 32 connected to the subscriber's set-top box 16. For example, the content that is downloaded by the requesting set-top box 16, such as a movie, may be stored on a video serving domain disk or a virtual disk prior to being streamed to a television 32 for viewing or prior to being stored to the partition 34 accessible to the associated subscriber, such as the subscriber's disk or virtual disk.

Finally, remote subscribers querying the same content are allowed access to the content now stored at the subscriber location. See block 108. For example, another subscriber desiring to see the same movie that a subscriber on the network has previously queried, obtained, and stored in the storage area 30 may be able to query for and then access the movie file as stored in the storage area 30 of the previous subscriber's set-top box 16. Content stored at a subscriber location, however, may be deleted periodically, as shown in block 124. For example, the set-top box 16 may be configured to delete content stored in the partition 36 accessible to the content provider after a predetermined length of time, such as 24 hours.

The content accessed according to embodiments of the method may comprise complete files, such as a movie in its entirety, or fragments of a complete file, such as "chapters" of a movie. Thus, according to one embodiment, fragments of a complete file may be independently queried, a preferred source for each fragment determined, and various fragments obtained from different sources. The various fragments would be assembled into a complete content file and stored at the subscriber location, however, such that the subscriber may use the content in its entirety, for example by viewing a movie from beginning to end.

Figure 3:
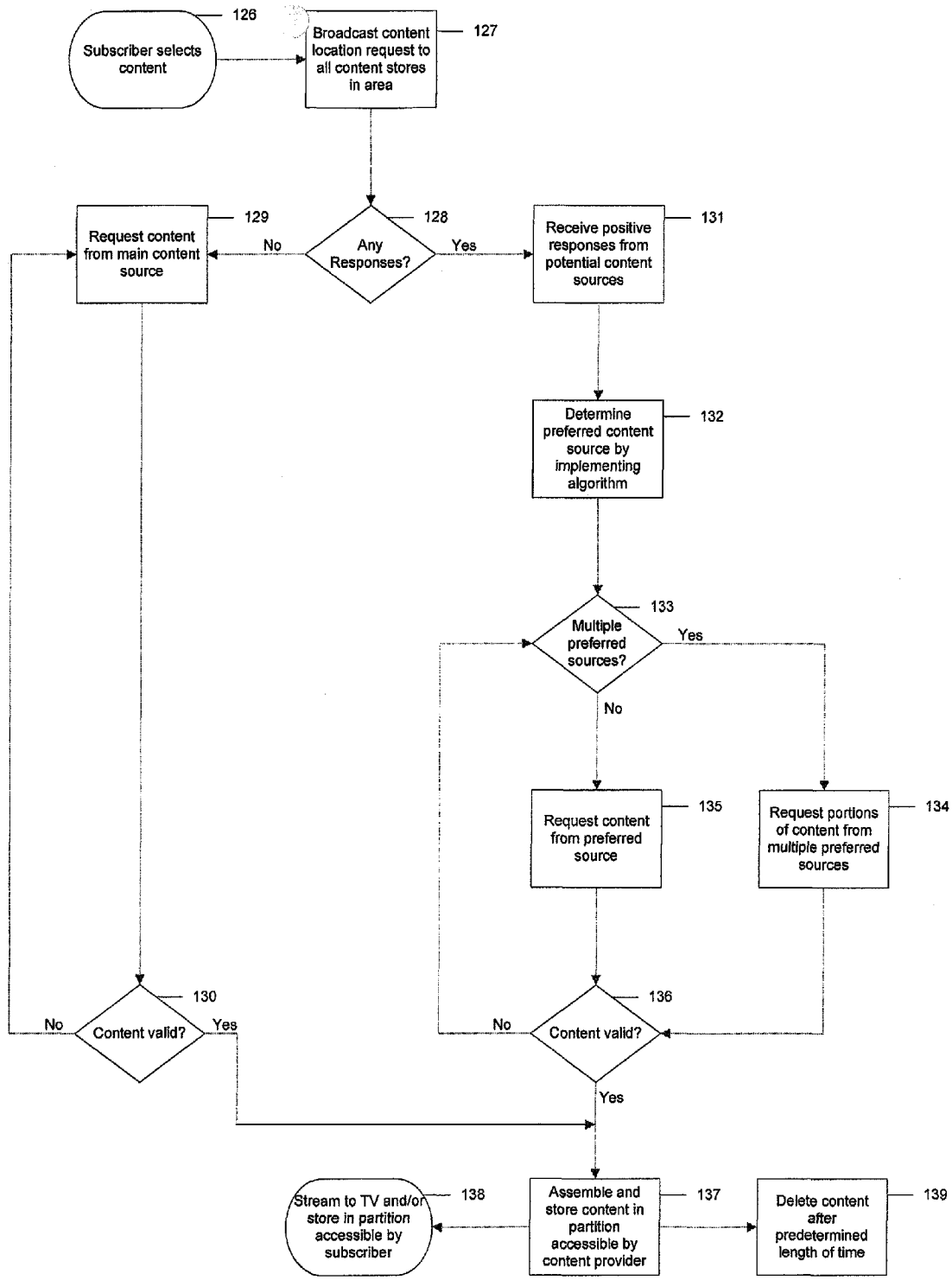
FIG. 3 is a flow chart illustrating an exemplary embodiment of the method of FIG. 2.

For example, content may be accessed according to an exemplary embodiment illustrated in FIG. 3. In the exemplary embodiment, a subscriber selects content for viewing or for storage in the storage area 30 of the subscriber's set-top box 16. A content location request is then broadcast to all content sources within the subscriber's video serving area, i.e., the set-top boxes 16 connected to the network within the subscriber's video serving area. If the requesting set-top box 16 does not receive any positive responses, which would indicate that none of the connected set-top boxes 16 in the area have the requested content, the requesting set-top box 16 downloads the content from the main content source 18. See FIG. 3, blocks 126-129.

If the requesting set-top box 16 receives positive responses to its content location request, the requesting set-top box 16 executes an algorithm based on a combination of the available bandwidth between each potential content source and the requesting set-top box 16 and the IP proximity of each potential content source to the requesting set-top box 16. See blocks 131-132. Based on the algorithm executed by the requesting set-top box 16, a preferred content source is determined.

If the requesting set-top box 16 determines more than one preferred content source, the set-top box 16 requests portions of the content from each of the multiple preferred content sources. See block 134. For example, if a movie having 24 chapters of content is requested and the requesting set-top box determines 4 preferred content sources based on the algorithm, the requesting set-top box 16 may request chapters 1-6 from the first preferred source, chapters 7-12 from the second preferred source, chapters 13-18 from the third preferred source, and chapters 19-24 from the fourth preferred source. In this way, the time required for transmitting the four smaller files (which may be, for example, a quarter of the size of the complete file) at approximately the same time from the four preferred content sources to the requesting set-top box 16 may be less than the time that would have been required for transmitting the one complete file from one of the preferred sources, thereby increasing the speed of the download. Alternatively, if only one preferred content source is determined by the requesting set-top box 16, the complete file is requested and downloaded from the one preferred content source, as shown in block 135.

In the exemplary embodiment of FIG. 3, the content downloaded is then validated by the requesting set-top box 16. See block 136. For example, the content may be scanned by the requesting set-top box 16 to verify that the content is legitimate and/or that the content does not contain more than an acceptable amount of error. If the content is not acceptable, the requesting set-top box seeks to download the content (or the portion of content if the content was obtained from multiple preferred content sources) from a different preferred content source. For example, if one of the four preferred content sources in the previous example transmitted chapters 7-12 of the requested movie, but the content file was determined by the requesting set-top box 16 to be illegitimate, the requesting set-top box 16 may request chapters 7 and 8 from the first preferred content source, chapters 9 and 10 from the third preferred content source, and chapters 11 and 12 from the fourth preferred content source, thus bypassing the source of the illegitimate content. If, on the other hand, the requesting set-top box 16 determines that there was an error in the transmission of the content from one of the preferred content sources, then the requesting set-top box 16 may attempt to download the content again from the same content source. If after a predetermined number of attempts the transmission is still unsuccessful, the requesting set-top box 16 may turn to an alternate source, as previously mentioned.

Similarly, if content downloaded from the main content source 18 is determined to be invalid, the requesting set-top box 16 requests the content again from the main content source 18. See block 130. If, however, after a predetermined number of attempts the requesting set-top box 16 is unable to download acceptable content, the requesting set-top box may cease the attempts and may report an error to the subscriber.

If the content is determined by the requesting set-top box 16 to be valid, the requesting set-top box 16 then assembles the content files (if portions of the complete file were obtained from different preferred sources) and stores the content in the partition 36 of the storage area 30 that is accessible to the content provider. For example, the content may be stored on a video serving domain disk or virtual disk. The content may then be streamed to the subscriber's television for viewing by the subscriber and/or stored to the partition 34 of the storage area 30 that is accessible to the subscriber, such as the subscriber disk or virtual disk in the subscriber set-top box 16. See blocks 137 and 138. Content stored in the partition 36 accessible by the content provider may be erased after a set time period, such as 24 hours. See block 139. However, content that has been transferred to the subscriber-accessible partition 34 may be available for use by the subscriber even after the content has been erased from the partition 36.

Figure 4:
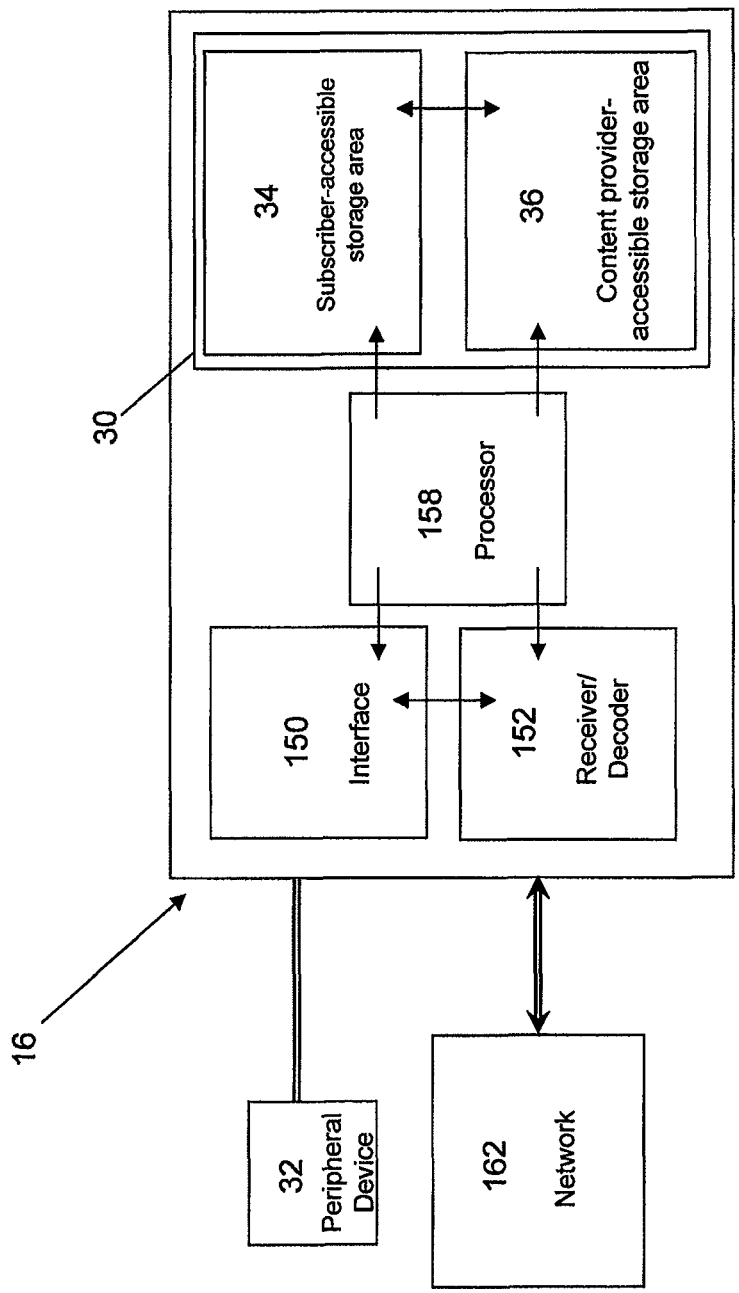
FIG. 4 is a block diagram showing one embodiment of the set-top box.

A set-top box 16 is also provided according to some embodiments, shown in FIG. 4. The set-top box 16 comprises an interface 150 configured to engage a packet-switching network 162, such as the Internet, a storage area 30, and a receiver and decoder 152. The storage area 30 is partitioned into at least two partitions 34, 36, with at least one of those partitions 36 being accessible by a content provider. The receiver and decoder 152 is configured to receive digital content from a source or deliver digital content to a digital-ready device, such as a main content source 18 or a different subscriber set-top box 16, store the content in the partition 36 of the storage area 30 that is accessible by the content provider, and convert the digital content for display on a peripheral device 32 such as a television.

The set-top box 16 allows other remote set-top boxes 16 to which it is connected to access the partition 36 of the storage area 30 that is designated for the use of the content provider. In this way, remote set-top boxes 16 may copy content from the storage area 30 of the set-top box 16, and vice versa. One of many possible system 10 configurations is shown in FIG. 1. The set-top box 16 may be in communication with other set-top boxes 16 or main content source 18 using a communications protocol such as, but not limited to, peer to peer protocols such as BitTorrent. In addition, the set-top box 16 may be in communication with network elements such as routers connected to the network, such as a first router 12, a second router 14, an intermediate router 22, 23, or more than one of these in series, as shown in FIG. 1, where the connected routers enforce policy that may determine to which segments of the network queries for content sources may be routed.

In some embodiments, the set-top box 16 may further comprise a processor 158, such as a microprocessor, a controller, or other computing device, for performing or at least directing the various functions of the set-top box 16 described above. For example, the process may determine a preferred source of the digital content. The processor 158 may determine the preferred source based on the bandwidth of the source, the distance between the source and the set-top box 16, or other preferences. For example, the processor 158 may use an algorithm to analyze the IP network distance between the set-top box 16 and each potential source, then determine the source associated with the shortest distance, as described above. Typically, the process operates under the control of software for performing each of the functions subscribed to the set-top box 16. This software may also be stored by the storage area 30 or by another associated memory device.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A system comprising:
   a plurality of content sources configured to receive and store content; and
   a router in communication with a first subset of the plurality of content sources;
   wherein, in response to a request for content received by the router, the router queries the first subset of the plurality of content sources for the requested content and, when the requested content is not available from the first subset of the plurality of content sources, the router transmits a query to a next available upstream router to query a larger subset of the plurality of content sources serviced by the next available upstream router,
   wherein the query is forwarded to one or more further next available upstream routers to query one or more further larger subsets of the plurality of content sources serviced by the one or more further next available upstream routers until either a copy of the requested content is determined to be available in one of the plurality of content sources or a main content source is determined to be closer in distance to the router than a further next available upstream router included in the one or more further next available upstream routers.

2. The system of claim 1, wherein the request for content is received by the router from a content source included in the first subset of content sources.

3. The system of claim 1, wherein the plurality of content sources comprises a plurality of set-top boxes.

4. The system of claim 1, wherein the plurality of content sources are configured to operate according to a peer-to-peer file distribution protocol.

5. The system of claim 1, wherein each content source in the plurality of content sources includes a partitioned storage area with at least one partition accessible by a content provider.

6. The system of claim 1, wherein:
   a content source included in the plurality of content sources initiates the request for the content; and
   when the requested content is available from one or more other content sources included in the plurality of content sources, the requesting content source determines a preferred content source, from the one or more other content sources, based on at least one of a geographic distance, an Internet Protocol distance, a speed of data transmission, a bandwidth, and a volume of data traffic between the preferred content source and the requesting content source.

7. The system of claim 1, wherein the next available upstream router forwards the query to the larger subset of the plurality of content sources serviced by the next available upstream router.

8. The system of claim 1, wherein the first subset of the plurality of content sources, the router, and the next available upstream router are arranged in a hierarchical network topology such that an upstream network communication pathway is formed from each content source included in the first subset of the plurality of content sources to the router to the next available upstream router.

9. The system of claim 1, wherein when the main content source is determined to be closer in distance than the further next available upstream router included in the one or more further next available upstream routers, the requested content is requested from the main content source.

10. The system of claim 9, wherein the distance is one of an IP network distance and a geographical distance.

11. A method comprising:
receiving, by a router, a request for requested content from a content source included in a plurality of content sources;
querying, by the router, a first subset of the plurality of content sources for the requested content;
transmitting, by the router when the requested content is determined not to be available from the first subset of the plurality of content sources, a query for the requested content to a next available upstream router;
receiving, by the next available upstream router, the query for the requested content from the router;
querying, by the next available upstream router, a larger subset of the plurality of content sources for the requested content; and
forwarding, by the next available upstream router, the query to one or more further next available upstream routers to query one or more further larger subsets of the plurality of content sources serviced by the one or more further next available upstream routers until either a copy of the requested content is determined to be available in one of the plurality of content sources or a main content source is determined to be closer in distance to the router than a further next available upstream router included in the one or more further next available upstream routers.

12. The method of claim 11, wherein the plurality of content sources comprises a plurality of set-top boxes.

13. The method of claim 11, wherein the plurality of content sources are configured to operate according to a peer-to-peer file distribution protocol.

14. The method of claim 11, wherein each content source in the plurality of content sources includes a partitioned storage area with at least one partition accessible by a content provider.

15. The method of claim 11, further comprising:
determining, when the requested content is available from one or more content sources included in the plurality of content sources, a preferred content source, from the one or more content sources, based on at least one of a geographic distance, an Internet Protocol distance, a speed of data transmission, a bandwidth, and a volume of data traffic between the preferred content source and the requesting content source.

16. The method of claim 11, wherein the first subset of the plurality of content sources, the router, and the next available upstream router are arranged in a hierarchical network topology such that an upstream network communication pathway is formed from each content source included in the first subset of the plurality of content sources to the router to the next available upstream router.

17. A system comprising:
a router in communication with a first subset of a plurality of set-top boxes; and
a next available upstream router from the router, the next available upstream router in communication with the router and with a larger subset of the plurality of set-top boxes;
wherein the router:
receives a request for content from a set-top box included in the first subset of the plurality of set-top boxes,
queries the first subset of the plurality of set-top boxes for the requested content, and
transmits, when the content is not available from the first subset of the plurality of set-top boxes, a query for the requested content to the next available upstream router; and
wherein the next available upstream router:
receives the query for the requested content from the router,
queries the larger subset of the plurality of set-top boxes for the requested content, and
forwards the query to one or more further next available upstream routers to query one or more further larger subsets of the plurality of set-top boxes serviced by the one or more further next available upstream routers until either a copy of the requested content is determined to be available in one of the plurality of set-top boxes or a main content source is determined to be closer in distance to the router than a further next available upstream router included in the one or more further next available upstream routers.

18. The system of claim 17, wherein the plurality of set-top boxes, the router, and the next available upstream router are configured to operate according to a peer-to-peer file distribution protocol.

19. The system of claim 17, wherein each set-top box in the plurality of set-top boxes includes a partitioned storage area with at least one partition accessible by a content provider.

20. The system of claim 17, wherein the first subset of the plurality of set-top boxes, the router, and the next available upstream router are arranged in a hierarchical network topology such that an upstream network communication pathway is formed from each set-top box included in the first subset of the plurality of set-top boxes to the router to the next available upstream router.

* * * * *